United States Patent [19]
Gozdz et al.

[11] Patent Number: 5,840,087
[45] Date of Patent: Nov. 24, 1998

[54] METHOD FOR MAKING LAMINATED RECHARGEABLE BATTERY CELLS

[75] Inventors: Antoni S. Gozdz, Tinton Falls; Paul C. Warren, Far Hills, both of N.J.

[73] Assignee: Bell Communications Research, Inc., Morristown, N.J.

[21] Appl. No.: 710,481

[22] Filed: Sep. 18, 1996

[51] Int. Cl.$^6$ .................................................. H01M 10/00
[52] U.S. Cl. ........................ 29/623.3; 29/623.5; 156/182; 156/249
[58] Field of Search ................ 29/623.5, 623.3; 156/182, 249

[56] References Cited

U.S. PATENT DOCUMENTS

4,935,317  6/1990  Fauteux et al. .
5,100,746  3/1992  Muller et al. .
5,435,054  7/1995  Tonder et al. .
5,470,357  11/1995  Schmutz et al. .

Primary Examiner—John S. Maples
Attorney, Agent, or Firm—Joseph Giordano; David A. Hey; Loria B. Yeadon

[57] ABSTRACT

Formation of a unitary laminate rechargeable battery comprising electrode and separator/electrolyte elements of polymer composition utilizes apparatus comprising compression rollers of sufficient hardness to resist deformation during laminating contact with such elements. Maximum progressive compression short of lateral deformation of battery elements ensures expulsion of interfacial entrapments and optimum functional contact between laminate elements. Battery structures fabricated with the apparatus may comprise active particulate component ratios in excess of about 75% by weight.

2 Claims, 7 Drawing Sheets

METHOD FOR MAKING LAMINATED RECHARGEABLE BATTERY CELLS

BACKGROUND OF THE INVENTION

This invention relates to a method of making a rechargeable electrolytic battery cell comprising a unitary laminate of polymeric electrode and separator elements, and, particularly, to apparatus for performing the lamination of such elements.

Versatile lithium-ion rechargeable battery cells are currently prepared from electrode elements comprising flexible sheets of polymeric composition in which are dispersed finely-divided particulate materials capable of reversibly intercalating lithium ions during battery charge/discharge cycles. Such materials include, as positive electrode components, lithium metal oxide intercalation compounds, e.g., $LiCoO_2$, $LiNiO_2$, and $LiMn_2O_4$, and, as negative electrode components, carbon materials, such as petroleum cokes and graphites. Included in the cell structures are flexible electrode-interposed separator/electrolyte layer elements comprising polymers of essentially the same type as employed in the electrode elements, thus facilitating thermal lamination of the element layers to ultimately form the battery composite. Additional cell elements, such as metallic foil or grid electrical current collectors, are also incorporated into the battery structure in a laminating operation.

This general process of battery cell fabrication is described in greater detail in U.S. Pat. No. 5,460,904 and its related patent specifications, incorporated herein by reference, which discuss typical compositions and procedures for formulating and laminating composite lithium ion cells. In those disclosures, the electrode elements comprised up to about 56% by weight of active component, i.e., the respective particulate intercalation material, and the lamination of cell elements was effectively accomplished in either a heated flat-bed press or commercial card laminator comprising pressure rollers normally having deformable surfaces of silicon rubber or the like.

More recently, electrode compositions have been formulated with a greater proportion of particulate active component in order to achieve higher specific capacity performance. Results obtained with these reformulated laminate cells did not exhibit the expected improvement, however. Observed performance limitations and instabilities were subsequently determined to be attributable to inadequate laminate adhesion between cell elements, apparently due to the increased particulate/polymer ratio. The present invention is directed toward resolution of this problem.

SUMMARY OF THE INVENTION

In the process of the present invention, lamination of the cell elements is carried out in stages under a longitudinally progressive, substantially unyielding pressure front, in contrast, for example, to the wide-area perpendicular pressure pattern formed in the previously-suggested flat-bed press. In particular, the invention utilizes pressure rollers which present a surface that is more pressure resistant than the compacted electrode composition of a laminate battery cell, i.e., a surface which is not significantly deformed under laminating pressure, primarily since it is harder than the more resilient rubber or plastic rollers of previously-employed laminating devices. Effective roller materials include metals, preferably non-oxidizing types, such as stainless or chromed steel, which retain a consistently smooth surface, or low-resilience synthetic compounds, such as Nylon or Delrin polymers.

In a first-stage operation, one or a pair of electrode element composition layers is laminated to the respective cell current collector foil, which is preferably reticulate or perforate, at a preheat temperature of about 120°–150° C. and under an inter-roller nip caliper/pressure which is minimally less than that which would result in a lateral deformation of the electrode composition layer. Such an empirical specification for the caliper or pressure setting is necessitated by the wide ranges of available laminating conditions and electrode compositions, which now may comprise particulate component ratios of up to about 75% by weight, but may be readily determined for any particular application without undue experimentation.

A second-stage operation, in general, laminates electrode composite members to an interposed separator/electrolyte element having a polymeric composition comprising substantially less particulate material; therefore, a lower assembly preheat temperature may be utilized, e.g., in the range of about 100°–120° C., and the roller nip caliper may be fixed at a predetermined final laminate thickness which may range about 50–100 $\mu$m less than the pre-laminate assembly. In a preferred variant of this process, the desired thickness of the separator/electrolyte element is provided in two layers which are individually laminated to the electrode composition surfaces of the respective electrode sub-assemblies in an intermediate operation prior to being laminated together to complete the cell assembly. This sequence of operations affords an opportunity to confirm a flawless electrode/separator laminate interface and ultimately results in the ability to use thinner separator elements, thereby increasing the energy density, or capacity, of the battery cell. A further advantage is achieved in the ready cohesive bonding of the polymer-rich interface of the final separator layer lamination which also contributes to the sealing of any discontinuities in the layer which might otherwise lead to irregular ion transfer between electrodes.

BRIEF DESCRIPTION OF THE DRAWING

The present invention will be described with reference to the accompanying drawing of which.

DESCRIPTION OF THE INVENTION

Figure 1:
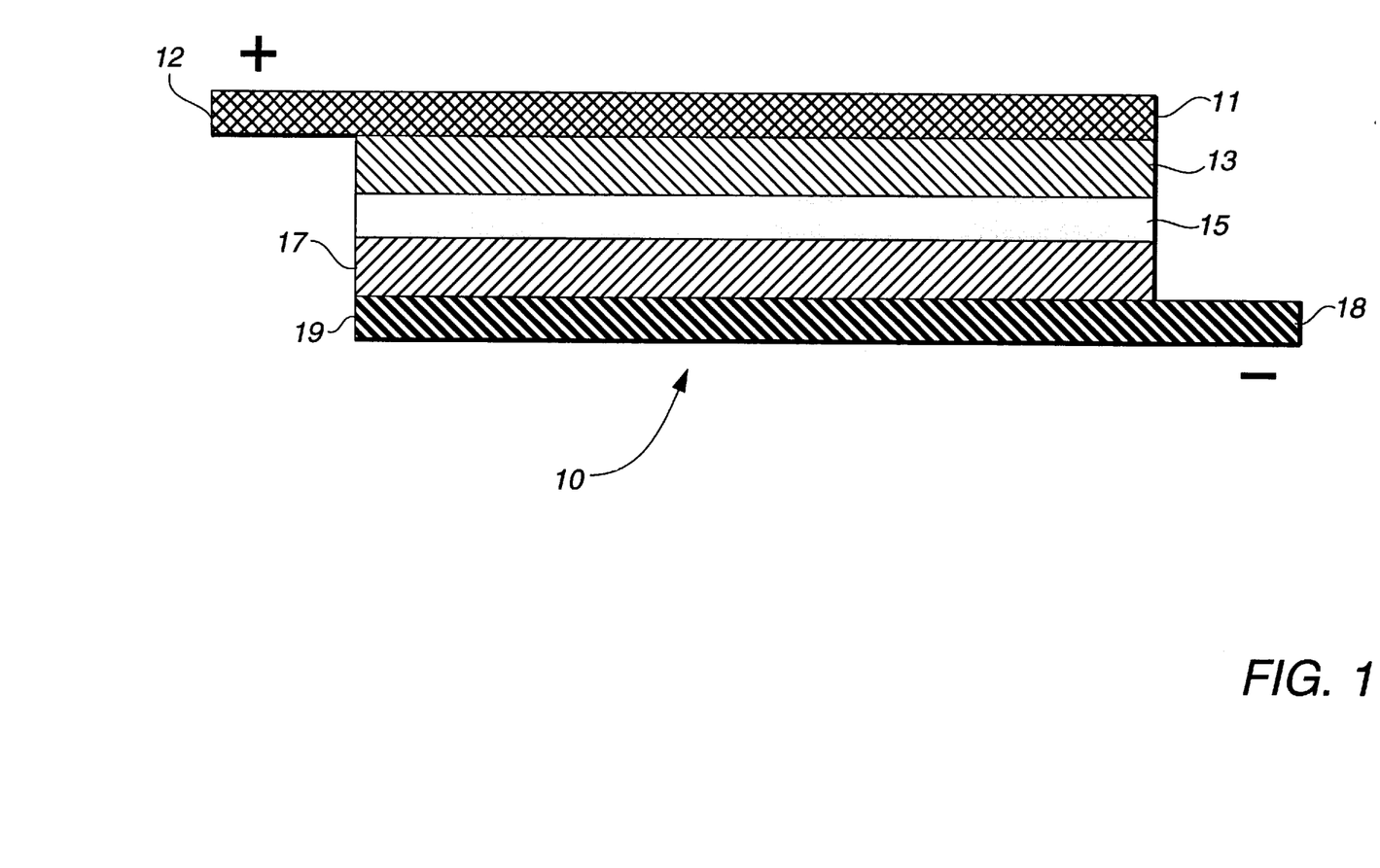
FIG. 1 is a diagrammatic representation of a typical laminated lithium-ion battery cell structure prepared by application of the present invention.

Useful lithium-ion cell batteries have been made available economically through the technological advances described in the above-referenced incorporated patent specifications. A representative structure of such a cell 10 is depicted in FIG. 1 and essentially comprises positive and negative electrode layer elements 13, 17 between which is interposed a separator/electrolyte element 15 comprising a polymeric matrix, preferably a poly(vinylidene fluoride) copolymer, in which a lithium salt electrolyte solution will ultimately be dispersed. These electrodes respectively comprise a lithiated intercalation compound, e.g., $Li_xMn_2O_4$, and a complementary material capable of reversibly intercalating lithium ions, e.g., carbon in the form of petroleum coke or graphite, each dispersed as particulates in a similar polymeric matrix. Electrically-conductive current collectors 11, 19, preferably of aluminum and copper, respectively, are bonded by thermal lamination with respective electrode elements 13, 17 to form electrode members which are, in turn, similarly bonded with separator/electrolyte element 15 to form a unitary battery cell. In order to facilitate subsequent processing of the cell to incorporate the lithium salt electrolyte, at least one of the collector elements is permeable to fluids, such as in the form of a reticulate expanded metal grid 11. To provide simple battery terminal contacts, the current collector elements may be extended as tabs 12, 18.

Figure 2:
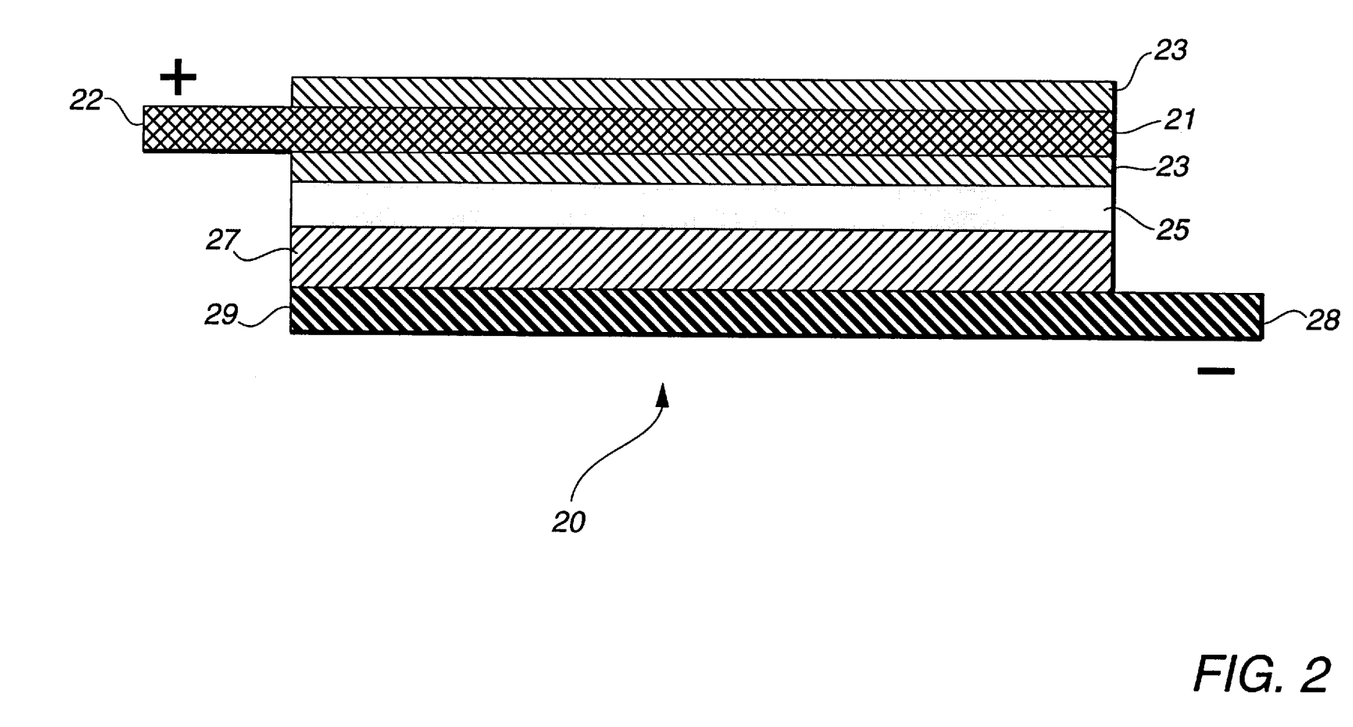
FIG. 2 is a diagrammatic representation of a variant laminated lithium-ion battery cell structure prepared by application of the present invention.

A variant cell structure is shown in FIG. 2 where the positive electrode member comprises two electrode composition layers 23, 23 which are laminated together with current collector grid 21. The resulting composite electrode/collector member is then laminated with separator element 25 and negative electrode/collector laminate member 27, 29, which may also be structured of a grid collector and multiple electrode layers as with the positive member, to form unitary battery cell 20. The advantage of this composite electrode member structure lies in the manner in which the polymeric electrode composition of elements 23 penetrates the open grid to form a single coherent electrode layer within which collector grid 21 is essentially embedded. In addition to establishing ionic conductivity throughout the electrode composition, this lamination ensures intimate electronic contact between the electrode and collector elements and, further, advantageously provides firm polymer matrix bonding and physical reinforcement for the relatively fragile reticulate collector element. Such added integrity is particularly useful when fashioning compact multilayer batteries of high capacity by repeated or concentric folding of an elongate flexible cell.

Illustrative examples of the preparation of separator/electrolyte and high capacity electrode elements for which the invention is particularly well suited are as follows:

EXAMPLE 1

A separator/electrolyte membrane coating solution was prepared by suspending 30 parts by weight of an 88:12 vinylidene fluoride (VdF):hexafluoropropylene (HFP) copolymer of about $380 \times 10^3$ MW (Kynar FLEX 2801, Atochem) and 20 parts silanized fumed silica in about 200 parts acetone and adding to this mixture about 40 parts dibutyl phthalate (DBP) plasticizer. The completed mixture was warmed to about 50° C. to facilitate dissolution of the copolymer and was homogenized in a laboratory ball mill for about 6 hr. A portion of the resulting slurry was coated on a glass plate with a doctor blade device gapped at about 0.5 mm. The acetone coating vehicle was allowed to evaporate within the coating enclosure under moderately flowing dry air at room temperature for about 10 min to yield a tough, flexible, plasticized film which was stripped from the glass plate. The film was about 0.1 mm thick and was easily cut into rectangular separator elements.

EXAMPLE 2

A positive electrode composition was prepared by homogenizing in a lid-covered stainless steel blender for about 10 min at 2500 rpm a mixture of 65 parts by weight of 53 $\mu$m sieved $Li_xMn_2O_4$, wherein $1<x\leq2$ (e.g., $Li_{1.05}Mn_2O_4$ prepared in a manner described in U.S. Pat. No. 5,266,299), 10 parts VdF:HFP copolymer (FLEX 2801) of Example 1, 18.5 parts dibutyl phthalate, 6.5 parts conductive carbon (Super-P Black, MMM Carbon, Belgium), and about 100 parts acetone. The resulting slurry was degassed by briefly applying a reduced pressure to the mixing vessel, and a portion was then coated on a glass plate with a doctor blade device gapped at about 0.4 mm. The coated layer was allowed to dry within the coating enclosure under moderately flowing dry air at room temperature for about 10 min to yield a flexible, plasticized film which was stripped from the glass plate. The film, comprising about 65% by weight of particulate active intercalation material, was about 0.12 mm thick and was easily cut into rectangular electrode elements.

EXAMPLE 3

A negative electrode composition was prepared by homogenizing in a lid-covered stainless steel blender for about 10 min at 2500 rpm a mixture of 65 parts by weight commercial petroleum coke (MCMB 25-10, Osaka Gas Co.), 10 parts VdF:HFP copolymer (FLEX 2801) of example 1, 21.75 parts dibutyl phthalate, 3.25 parts Super-P conductive carbon, and about 100 parts acetone. The resulting slurry was degassed, and a portion was then coated on a glass plate with a doctor blade device gapped at about 0.5 mm. The coated layer was allowed to dry within the coating enclosure under moderately flowing dry air at room temperature for about 10 min to yield a tough, flexible film which was readily stripped from the glass plate. The film, comprising about 65% by weight of particulate active intercalation material, was about 0.15 mm thick and was easily cut into rectangular electrode elements.

EXAMPLE 4

A battery cell 20 as depicted in FIG. 2 was prepared in the following manner. An 80×40 mm positive current collector of aluminum foil 21 in the form of an open mesh grid of about 30 $\mu$m thickness (e.g., MicroGrid precision expanded foil, Delker Corp.), was trimmed at one end to form a tab 22 which would subsequently serve as a convenient battery terminal. To enhance the ensuing adherence to its associated electrode element layers and improve contact resistance, grid 21 was surface-cleaned of oxides, such as with a caustic wash, and dip-coated with a conductive primer composition of commercial battery grade conductive carbon black, such as MMM Super P, dispersed in a commercially-available aqueous suspension of a copolymer of polyethylene with acrylic acid, e.g., Morton International Adcote primer 50C12. The fluid composition was sufficiently thin to preserve the reticulate nature of the grid and air-dried to a coating of about 1–5 $\mu$m thick.

Figure 3:
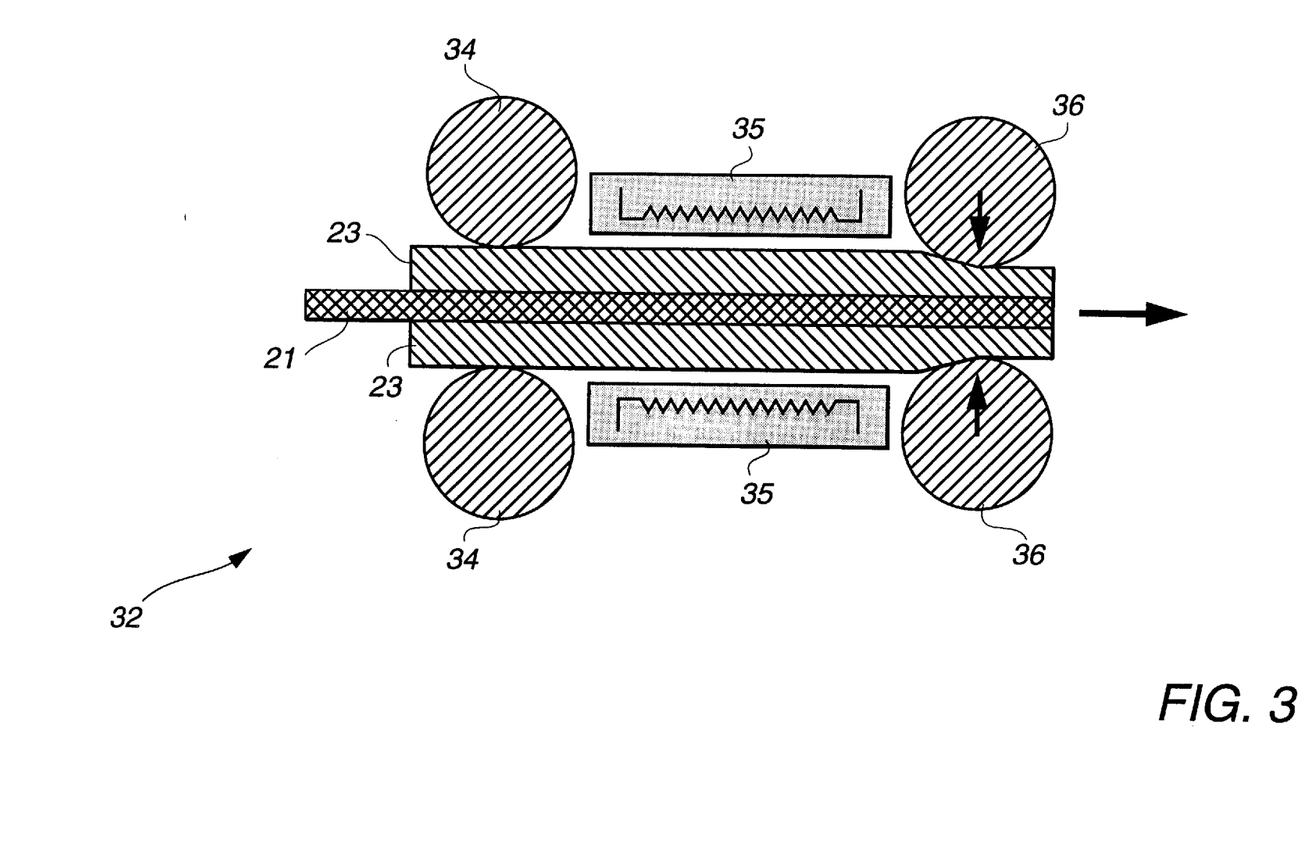
FIG. 3 is a diagrammatic representation of laminating apparatus of the present invention as applied in preparing an electrode/collector member for the battery cell structure of FIG. 2.

Two 60×40 mm sections were cut from the film of Example 2 to form positive electrode elements 23, 23 (FIG. 2) which were then assembled with grid 21 and laminated in apparatus of the invention such as is depicted in the representation of FIG. 3. As shown there, lamination apparatus 32 is essentially an improvement upon the card laminating device utilized in earlier battery cell prototype fabrication and comprises a pair of pilot rollers 34, heating elements 35, and pressure rollers 36. Rollers 34 are under nominal pressure and may have a resilient surface, since their role is to draw electrode assembly 21, 23 into the apparatus and direct its travel past heaters 35 which soften the polymer matrix of electrode composition elements 23. A useful adjunct in the preparation of smaller assemblies, e.g., test cells, is a pair of heat-conductive carrier sheets (not shown), such as 150 μm brass shim stock, between which a laminate assembly is temporarily positioned while being transported through the apparatus. This transport medium also serves to assist in uniformly distributing the heat and laminating pressure. The temperature of heaters 35 and the speed at which the cell assembly travels through the apparatus determines the temperature attained by the polymer matrix, which in this initial laminating operation is preferably about 120°–150° C.

Immediately beyond heaters 35, the heated electrode assembly encounters non-deformable primary pressure rollers 36 of stainless steel, for example, which are loaded, as under adjustable spring pressure indicated by the opposing arrows, in the range of about 45 N per linear cm of roller contact. As noted earlier, the load is more specifically adjusted, depending upon the composition and size of the electrode components, to a maximum which will not initiate lateral deformation of elements 23. Under such a load, the electrode composition is effectively pressed into intimate adhesive contact with collector element 21 while being compressed to expel substantially all entrapped voids. When, as depicted, grid collectors are utilized, the compression forces the electrode composition of elements 23 through the grid openings to form a single cohesive composition layer which encases collector 21.

Figure 4:
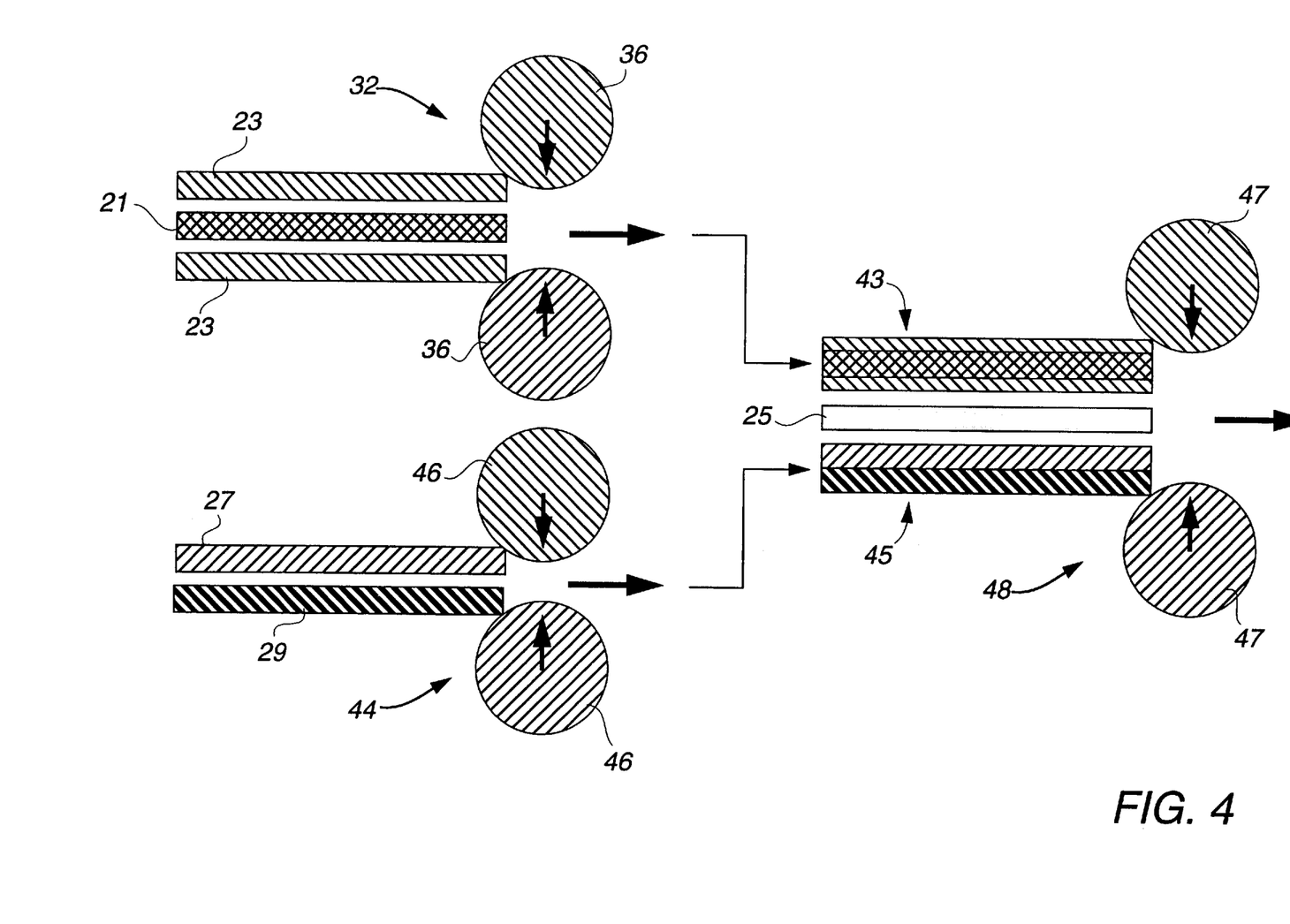
FIG. 4 is a diagrammatic representation of a laminating process according to the present invention as applied in preparing the battery cell structure of FIG. 2.

Further use of the apparatus, or replicate units thereof, to complete the structure of cell 20 (FIG. 2) is depicted more generally in FIG. 4 where laminating unit 32 of FIG. 3 is simply represented as a laminating station 32 having primary pressure rollers 36 which are spring-biased in the direction of the radial arrows. As shown in greater detail in FIG. 3, electrode composition film elements 23 are assembled with collector grid element 21 and laminated between rollers 36 at a maximum pressure, as earlier noted, to form positive electrode member 43. Negative electrode member 45 of the cell was similarly formed at station 44 by laminating a section of the electrode film 27, as prepared in Example 3, together with a primed copper foil collector element 29.

The resulting positive and negative electrode members 43, 45 were then assembled with a 60×40 mm separator/electrolyte element 25 as prepared in Example 1, and the assembly was laminated at station 48 to complete cell 20 of FIG. 2. Unlike the initial-stage lamination of the electrode members which comprise 65%, or greater, of solid particulate matter, lamination with the separator/electrolyte element may be effected under significantly less strenuous conditions, i.e., a pressure of about 20 N/cm at rollers 47 and a temperature of about 100°–120° C. A useful laminating operation alternative to adjusting the pressure at the primary rollers is to interpose beside the assembly margins a pair of non-compressible shim strips (not shown) of a thickness about 75 μm less than that of the pre-laminate cell assembly so that these strips will travel longitudinally through the pressure nip with the assembly to thereby limit the maximum resulting compression of the assembly cell components.

EXAMPLE 5

Figure 5:
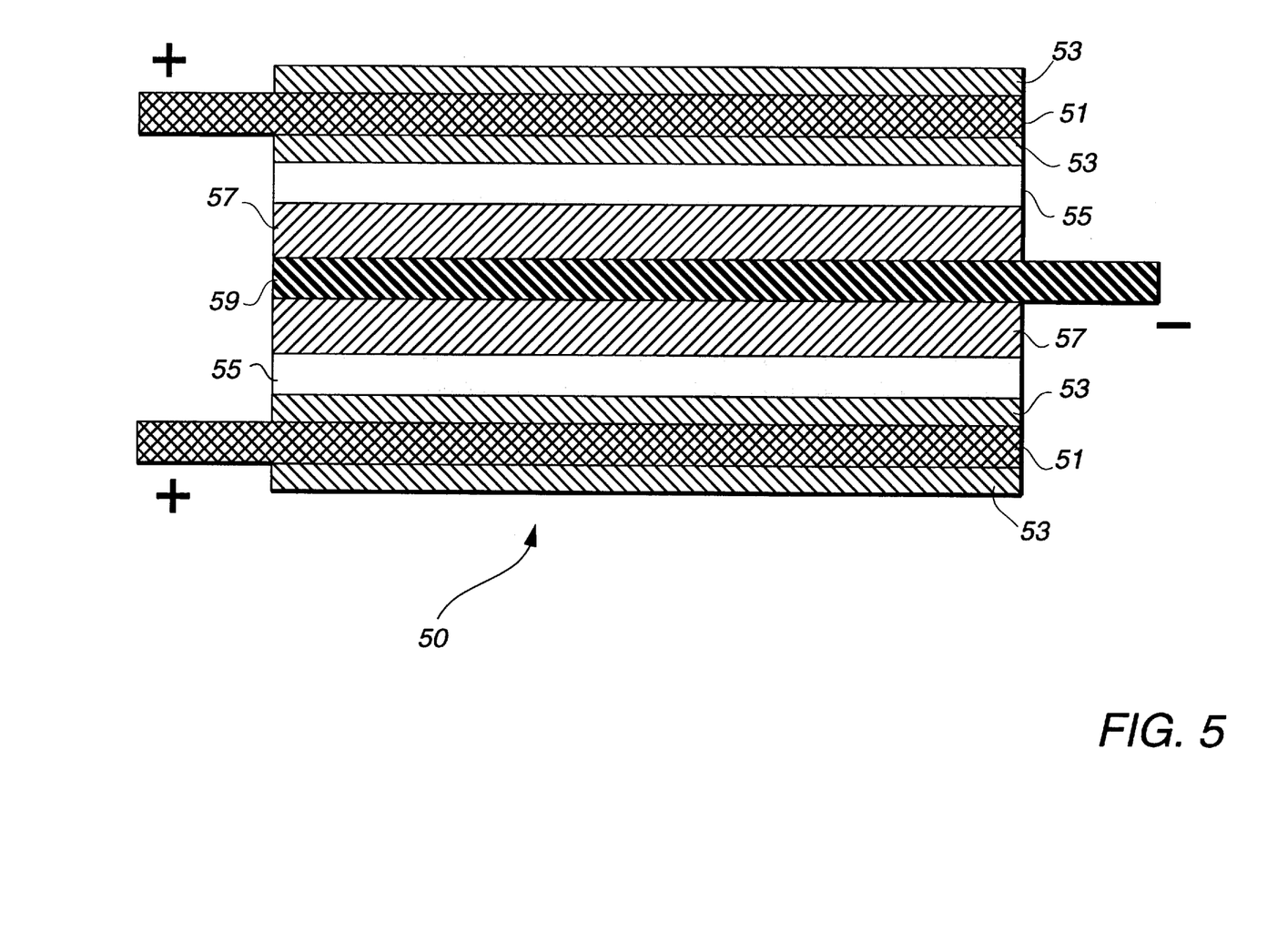
FIG. 5 is a diagrammatic representation of a multicell battery structure prepared by application of the present invention.

An extended battery cell 50, as depicted in FIG. 5, of substantially twice the capacity of cell 20 (FIG. 2) was prepared with duplicate positive collector grid elements 51 and positive and negative electrode film elements 53, 57, along with a single, common negative collector element 59, following a laminate fabrication procedure earlier described in which each of the three electrode/collector sub-assemblies was pre-laminated, as at station 32 or 44 of FIG. 4, prior to final lamination with separators 55, as at station 48.

Figure 6:
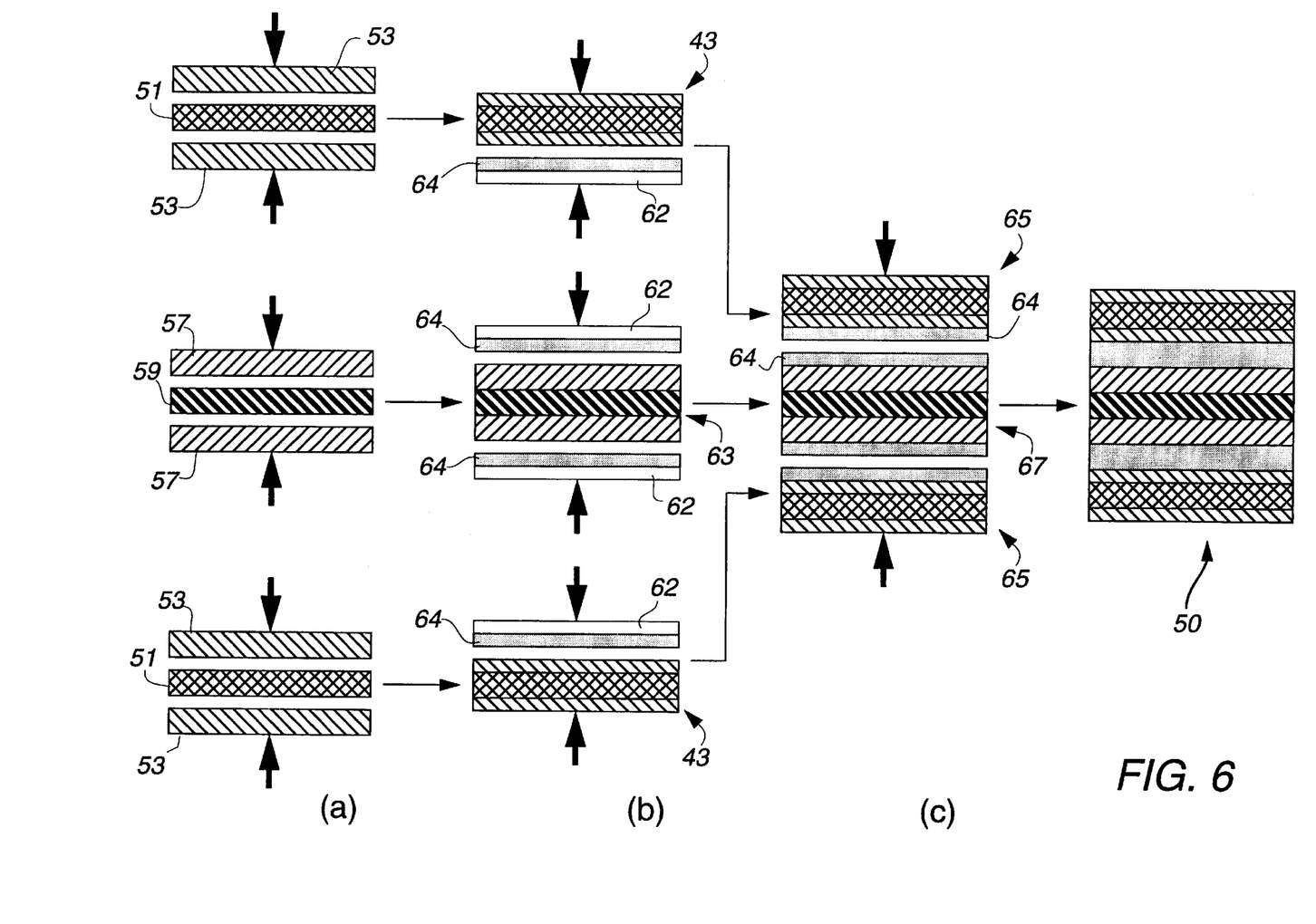
FIGS. 6a–6c are diagrammatic representations of the operations in a laminating process according to the present invention as applied in preparing the battery cell structure of FIG. 5.

A preferred application of the present invention in preparing battery cell 50 is depicted in greater detail in FIG. 6 where the laminating apparatus previously described is yet more simply represented by the opposed arrows. Thus, at step (a), the sets of collector and electrode film elements 51, 53 and 59, 57 are laminated to provide positive and negative electrode members 43, 43, and 63 which proceed to step (b) in the fabrication process. There, an electrode member, e.g., a positive member 43, is assembled with a separator/electrolyte element which comprises a removable, preferably transparent, carrier substrate 62 of polyethylene terephthalate, or similar abherent material, bearing a layer 64 of separator/electrolyte composition as prepared in Example 1. The thickness of layer 64 in this implementation is about half the desired final amount of separator/electrolyte composition, since, as will be seen, the balance of that layer will be provided in the subsequent lamination at step (c).

In step (b), layer 64 is laminated to the electrode composition surface of member 43 in the apparatus of the invention under sufficient temperature and pressure to expel all interlayer air and effect a flawless adhesive interface. In this respect, the transparent nature of carrier 62 is invaluable in ascertaining the optimum laminating conditions. Additionally, carrier 62 provides protection for the outer surface of layer 64 until the final lamination in step (c) and thus is of particular advantage in continuous fabrication processes. Companion electrode member 43 and intermediate negative electrode member 63 are similarly laminated with separator/electrolyte elements 62, 64 to yield final sub-assemblies 65, 67.

Figure 7:
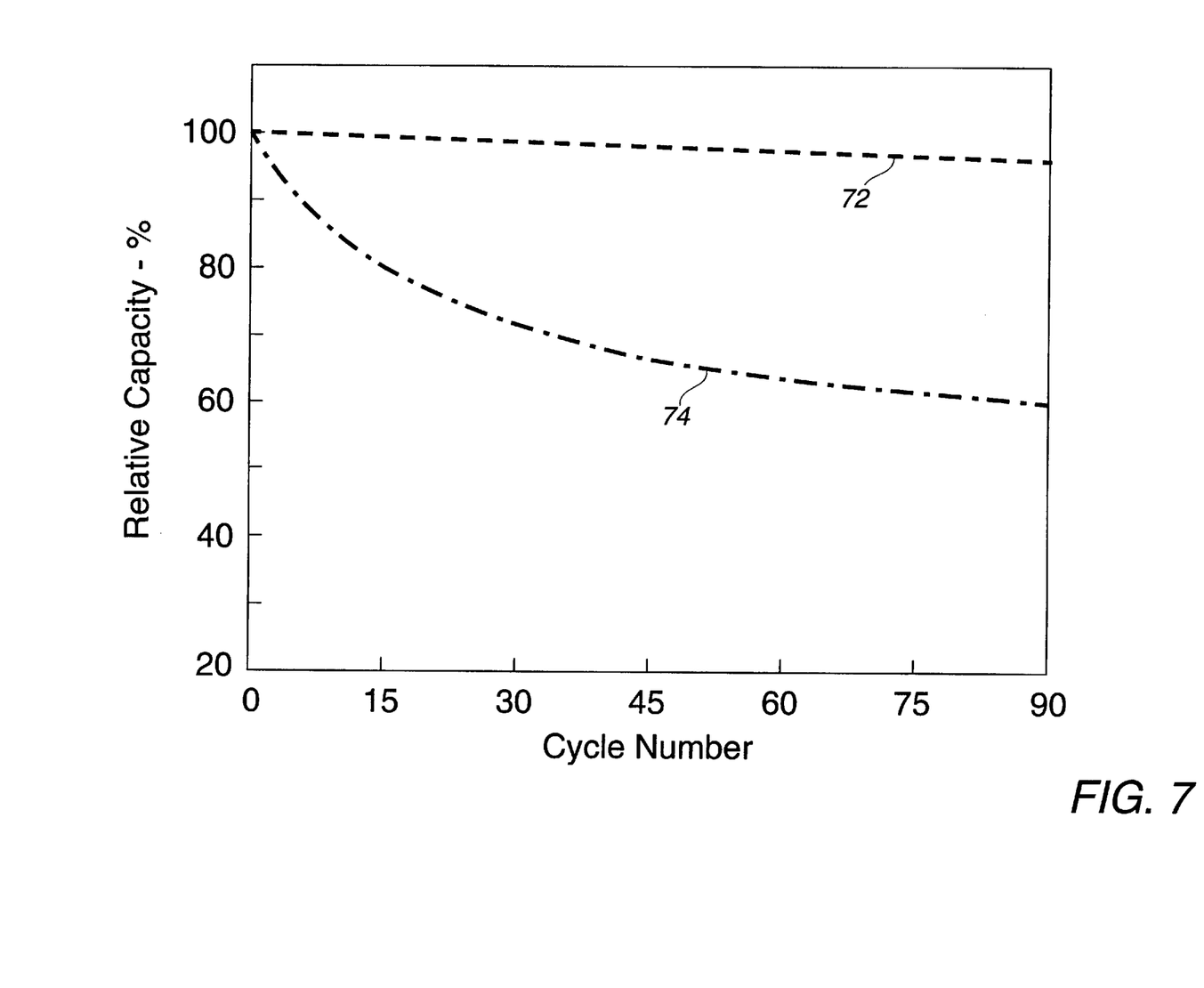
FIG. 7 is a graph comparing the relative capacities, over extended charge cycles, of batteries having a structure of FIG. 5 and fabricated, respectively, according to prior procedures and the present invention as depicted in FIG. 6.

Prior to assembly and lamination at step (c), carrier films 62 are removed (not shown) to expose the unblemished surfaces of facing separator/electrolyte layers 64, 64 which may then be laminated under reduced temperature and pressure conditions to effect a homogeneous, cohesive bond completing battery cell 50. The efficacy of the present invention may be seen in FIG. 7 which compares the variation 72 in capacity of cell 50 over the indicated series of charge/discharge cycles at a C/3 rate with the variation 74 in the capacity of a battery cell of identical structure and composition, but fabricated with equipment and procedures employed prior to the invention.

It is anticipated that other embodiments and variations of the present invention will become readily apparent to the skilled artisan in the light of the foregoing specification. Such embodiments and variations are intended to likewise be included within the scope of the invention as set out in the appended claims.

What is claimed is:

1. A method of laminating a layered assembly of rechargeable battery cell elements comprising at least one polymer matrix composition element wherein said assembly is heated to soften said at least one polymer composition element to a laminatable condition and said heated assembly is progressively compressed between a pair of rollers opposedly biased radially toward contact characterized in that a) a pair of subassemblies is formed wherein each such subassembly comprises said at least one polymer matrix composition element which comprises a layer having a first surface removably affixed to a carrier substrate and the other surface laminated to its contiguous assembly element to thereby form said laminate subassembly;

b) the carrier substrates of said subassemblies are removed; and c) the first surfaces of said composition layers thereby exposed are placed in contact with one another to form an assembly to be laminated.

2. A method according to claim 1 wherein said layers comprise a battery cell separator/electrolyte composition.

* * * * *